(12) United States Patent
Abe

(10) Patent No.: US 11,174,362 B2
(45) Date of Patent: Nov. 16, 2021

(54) METHOD OF PRODUCING A FILM-ATTACHED RESIN BASE

(71) Applicant: YKK Corporation, Tokyo (JP)

(72) Inventor: Takuya Abe, Kurobe (JP)

(73) Assignee: YKK Corporation, Tokyo (JP)

( * ) Notice: Subject to any disclaimer, the term of this patent is extended or adjusted under 35 U.S.C. 154(b) by 0 days.

(21) Appl. No.: 16/098,456

(22) PCT Filed: Feb. 22, 2017

(86) PCT No.: PCT/JP2017/006649
§ 371 (c)(1),
(2) Date: Nov. 2, 2018

(87) PCT Pub. No.: WO2017/203767
PCT Pub. Date: Nov. 30, 2017

(65) Prior Publication Data
US 2019/0091721 A1 Mar. 28, 2019

(30) Foreign Application Priority Data

May 26, 2016 (WO) .................. PCT/JP2016/065635

(51) Int. Cl.
*B05D 3/04* (2006.01)
*C08J 7/043* (2020.01)
(Continued)

(52) U.S. Cl.
CPC .............. *C08J 7/043* (2020.01); *B05D 3/04* (2013.01); *B05D 3/0446* (2013.01); *B05D 3/10* (2013.01);
(Continued)

(58) Field of Classification Search
CPC ................................ B05D 3/0446; B05D 7/02
See application file for complete search history.

(56) References Cited

U.S. PATENT DOCUMENTS

| | | | |
|---|---|---|---|
| 5,135,773 A * | 8/1992 | Suzuki | B05D 1/045 427/302 |
| 5,206,073 A | 4/1993 | Suzuki | |
| 2015/0017458 A1* | 1/2015 | Mizumoto | B29D 5/02 428/458 |

FOREIGN PATENT DOCUMENTS

| | | |
|---|---|---|
| CA | 1333679 C | 12/1994 |
| EP | 0363103 A2 | 4/1990 |
| | (Continued) | |

OTHER PUBLICATIONS

Gunma etal, "JP2008024959—English Translation," 2008, JPO, pp. 1-12 (Year: 2008).*

(Continued)

*Primary Examiner* — Nathan T Leong
(74) *Attorney, Agent, or Firm* — Kilpatrick Townsend & Stockton LLP

(57) ABSTRACT

A method of producing a film-attached resin base may include supplying a surface treatment gas including at least fluorine gas to a resin base including reinforcing fibers so that embrittled regions are formed in a surface of the resin base and the reinforcing fiber present near the surface of the resin base is modified at least partially; removing at least the embrittled regions so that an uneven surface is formed on the resin base and the reinforcing fiber is at least partially exposed in the uneven surface; and forming a film onto the uneven surface of the resin base.

19 Claims, 11 Drawing Sheets

(51) Int. Cl.
  *B05D 7/02*   (2006.01)
  *C25D 5/56*   (2006.01)
  *C25D 7/02*   (2006.01)
  *B32B 5/28*   (2006.01)
  *C23C 18/22*  (2006.01)
  *B05D 3/10*   (2006.01)
  *C08J 5/04*   (2006.01)
  *C23C 18/16*  (2006.01)

(52) U.S. Cl.
  CPC ............... *B05D 7/02* (2013.01); *B32B 5/28* (2013.01); *C08J 5/043* (2013.01); *C23C 18/1641* (2013.01); *C23C 18/22* (2013.01); *C25D 5/56* (2013.01); *C25D 7/02* (2013.01); *B05D 2201/02* (2013.01); *B05D 2350/35* (2013.01)

(56) References Cited

FOREIGN PATENT DOCUMENTS

| | | | |
|---|---|---|---|
| FR | 2719604 A | | 11/1995 |
| JP | 57-149463 A | | 9/1982 |
| JP | 62-001479 A | | 1/1987 |
| JP | 63-103077 A | | 5/1988 |
| JP | 63103077 | * | 7/1988 |
| JP | 2-099170 A | | 4/1990 |
| JP | 6-76668 B2 | | 9/1994 |
| JP | 2008-024959 A | | 2/2008 |
| JP | 5474626 B2 | | 4/2014 |
| JP | 5824310 B2 | | 11/2015 |
| WO | 2013/098978 A1 | | 7/2013 |

OTHER PUBLICATIONS

Supplementary European Search Report, European Patent Application No. 17802369.3, dated Jan. 8, 2020.
International Preliminary Report on Patentability, PCT Patent Application No. PCT/JP2017/006649, dated Dec. 6, 2018.
International Search Report, PCT Patent Application No. PCT/JP2017/006649, dated Mar. 28, 2017.
Office Action, Chinese Patent Application No. 201780021854.X, dated Jun. 24, 2020, 21 pages.
Ling, "Managing Technology for Economical Industrial Material", No. 352, Nov. 1992, Tianjin University Publishing Company, 6 pages.

* cited by examiner (B-1)

(B-2)

(C-1)

(C-2)

(C-3)

(C-4)

(C-5)

METHOD OF PRODUCING A FILM-ATTACHED RESIN BASE

TECHNICAL FIELD

The present disclosure relates to a film-attached resin base, a method of producing the same, and a method of producing a film.

BACKGROUND ART

Patent literature 1 discloses a method of plating a plastic material which can achieve superior adhesion. This literature discloses in its claim 1 that "Before the surface of the base of plastic material is processed through an electroless plating, the surface of a base of plastic material is etched or activated in advance based on contact with gas mixture mainly consisting of fluorine gas and insert gas". The literature describes, in its working example 3, that "Polycarbonate plate-like molded piece (3 mm (thickness)*50 mm*100 mm; a product of Mitsubishikasei corporation) is placed in a quartz glass bottle of 1 litter, the air is replaced with nitrogen gas, and then gas mixture is supplied therethrough for 20 minutes which consists of 20 cc/min of fluorine gas, 150 cc/min of nitrogen gas, and 1 cc/min of oxygen gas. Next, it is activated by using Sn—Pd similar to the working example 1, and then it is immersed in a 1 litter plating solution for an hour, thus producing a nickel film having 5.7 mm thickness". The Sn—Pd based activation stated here indicates two-step method (sensitization-activation), a representative of a catalyst-based activation pretreatment.

Patent literature 2 discloses a method of producing a resin base which has a modified surface. Regarding a technical problem, the literature states at para. 0006 "the present invention provides a method of producing a resin base by which the resin base, having a surface state for improved adhesion with a plating film etc., can be more easily produced, not only based on simple chemical surface modification of resin material by fluorine gas or gas mixture of fluorine gas and inert gas as in the prior art, but also based on physical surface modification" and continues to state that ""the physically modified surface" indicates that a surface is modified to be uneven.". The literature discloses in its claim 1 that "fluorine gas contacts a resin base so that the surface of the resin base is fluorinated, and then alcohol contacts the fluorinated surface of the resin base".

Patent literature 3 discloses a method of metal-plating for a polyolefin-based resin base. The literature states at paragraph 0008 that "it is a widely known fact that a metal plating film is not likely adhered to a surface of polyolefin-based resin base and may easily come off the surface". The literature continues to state at paragraph 0009 that "the present inventors has revealed, based on their laminated keen researches, a completely novel fact that a metal plating film, coating film or adhesive layer (herein after referred to as "a metal plating film and so on" for the sake of convenience) is surprisingly quite firmly adhered to a surface of a polyolefin-based resin base in a case where fluorine gas contacts the polyolefin-based resin base under a condition where 70% or more purity of the fluorine gas is used (i.e. content of fluorine gas is equal to or greater than 70%) and a level of decompression of fluorine gas is high, against the teaching of prior art that presumes that a plating film cannot be adhered to a surface of polyolefin-based resin base if the concentration of fluorine gas is greater than 10%".

CITATION LIST

Patent Literature

[PTL 1] Japanese Examined Patent Publication No. 6-76668
[PTL 2] Japanese Patent No. 5474626
[PTL 3] Japanese Patent No. 5824310

SUMMARY

Technical Problem

Patent literatures 1 to 3 disclose that fluorine gas is used to form an uneven surface in a surface of a resin base, i.e. fluorine gas based etching. However, adhesion strength of a film to the resin base obtained by such a method might be not necessarily satisfactory.

Solution to Problem

A method of producing a film-attached resin base according to an aspect of the present disclosure may include:
supplying a surface treatment gas including at least fluorine gas to a resin base (20) including reinforcing fibers (10) so that embrittled regions are formed in a surface of the resin base (20) and the reinforcing fiber (10) present near the surface of the resin base (20) is modified at least partially;
removing at least the embrittled regions so that an uneven surface is formed on the resin base (20) and the reinforcing fiber (10) is at least partially exposed in the uneven surface; and
forming a film (50) onto the uneven surface of the resin base (20).

In some cases, the removal of the embrittled regions may form deep recesses (40) each recessed along the periphery of the partially exposed reinforcing fiber (10) in the uneven surface, and the deep recesses (40) may be filled with the film (50).

In some cases, the reinforcing fiber (10) may be at least partially porosified with the surface treatment gas.

In some cases, the resin base (20) on which the embrittled regions are formed may be immersed in an acidic solution so that the embrittled regions are removed.

In some cases, the acidic solution may include one or more acids selected from a group consisting of hydrochloric acid, sulfuric acid, and nitric acid.

In some cases, the resin base (20) may include glass fibers as the reinforcing fibers (10), and the resin base (20) may include 10 to 60 mass percent of the glass fibers.

In some cases, the resin base (20) may include the glass fibers having mass percent greater than 30.

In some cases, the film (50) may be a plating film or a coating film.

In some cases, the film-attached resin base may be a sliding part.

In some cases, the film-attached resin base may be a slider (95) for a slide fastener.

A film-attached resin base according to another aspect of the present disclosure may include:
a resin base (20) including reinforcing fibers (10) and being provided with an uneven surface where the reinforcing fiber (10) partially emerges; and a film (50) formed on the uneven surface of the resin base (20).

In some cases, the film (50) may fill a deep recess (40) recessed along the periphery of the partially emerged reinforcing fiber (10) in the uneven surface.

A method of producing a film according to another aspect of the present disclosure may include:

supplying a surface treatment gas including at least fluorine gas to a resin base (20) including reinforcing fibers (10) so that embrittled regions are formed in a surface of the resin base (20) and the reinforcing fiber (10) present near the surface of the resin base (20) is modified at least partially;

removing at least the embrittled regions so that an uneven surface is formed on the resin base (20) and the reinforcing fiber (10) is at least partially exposed in the uneven surface; and forming a film (50) onto the uneven surface of the resin base (20).

Advantageous Effects of Invention

According to an aspect of the present disclosure, it would be possible to provide a film-attached resin base with improved adhesion strength.

BRIEF DESCRIPTION OF DRAWINGS

FIG. 2 (b) is a schematic view of a surface of a resin base where embrittled regions are formed.

FIG. 10 (a) shows a surface of a resin base of a slider before embrittled regions are formed.

FIG. 11 (b) is an expanded one of FIG. 11 (a).

DESCRIPTION OF EMBODIMENTS

Hereinafter, embodiments of the present invention will be described with references to FIGS. 1 to 11. Respective embodiments are not mutually exclusive. A skilled person in the art would combine the respective embodiments without requiring excess descriptions. A skilled person in the art would also understand synergic effects by such combinations. Overlapping descriptions among embodiments will be basically omitted. Referenced drawings are mainly for the purpose of illustrating an invention and may be simplified if so required.

Figure 1:
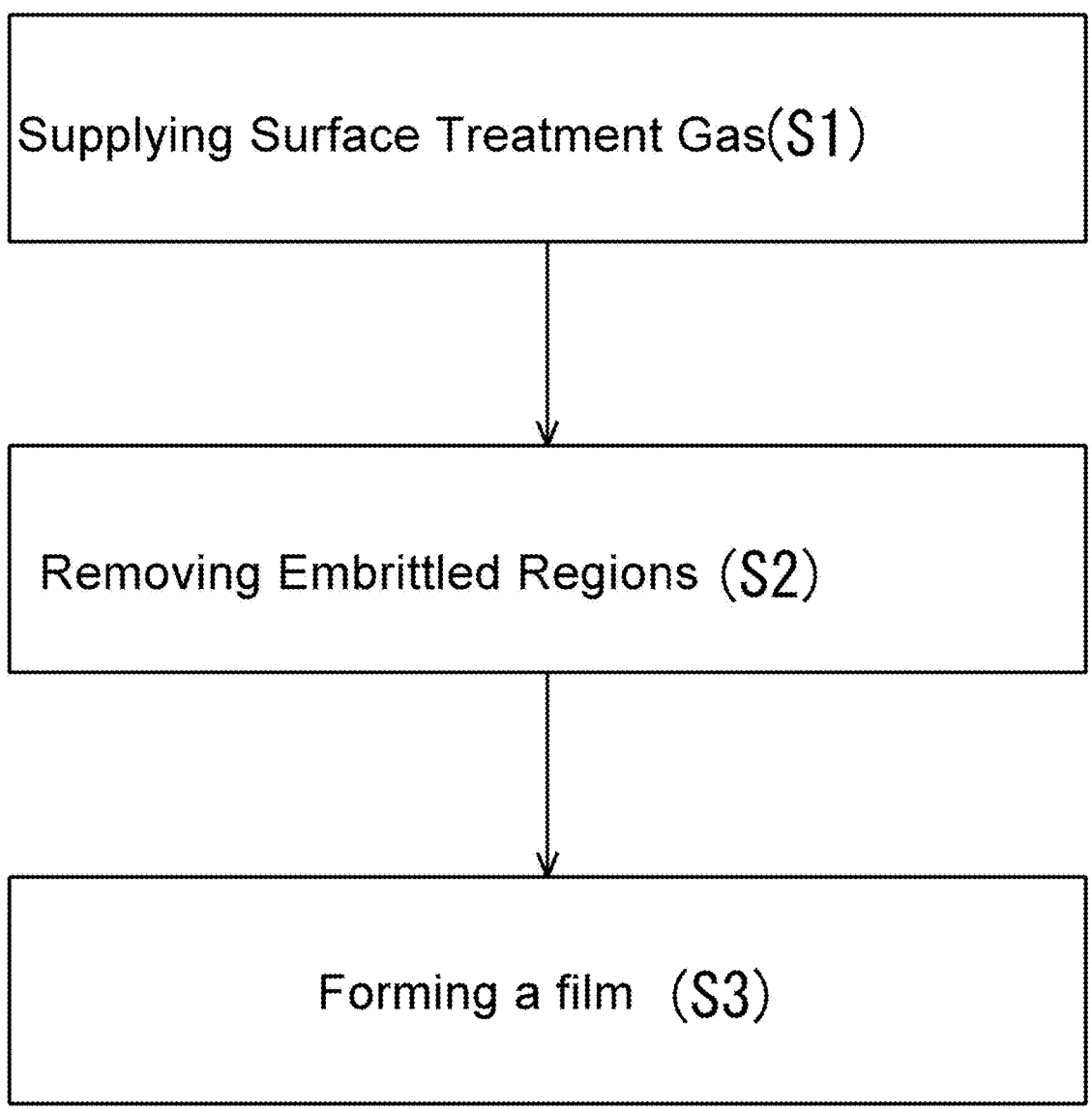
FIG. 1 is a schematic flowchart for a method of producing a film-attached resin base and a method of producing a film according to an exemplary embodiment of the present disclosure.
Figure 2A:
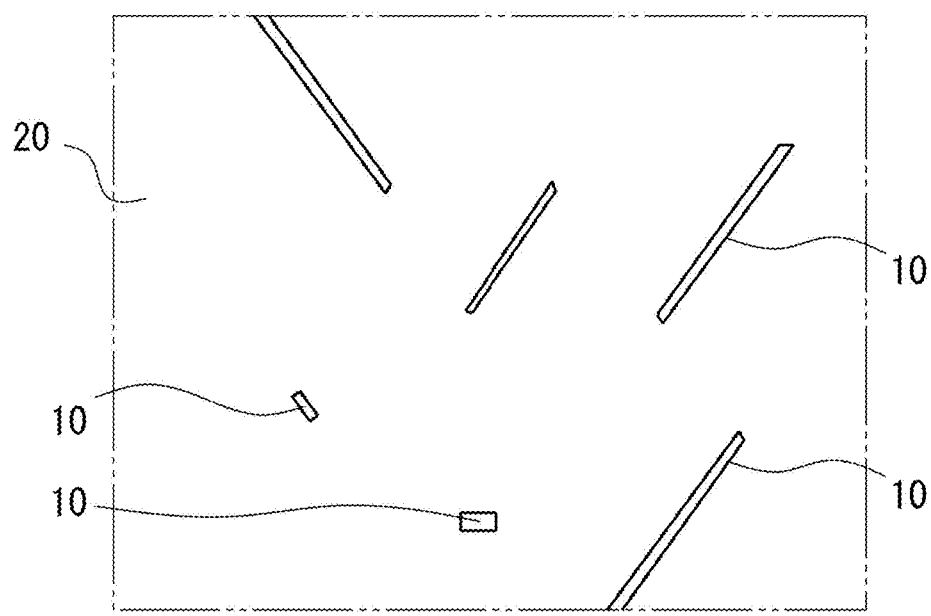
FIG. 2 (a) is a schematic view of a surface of a resin base.
Figure 2B:
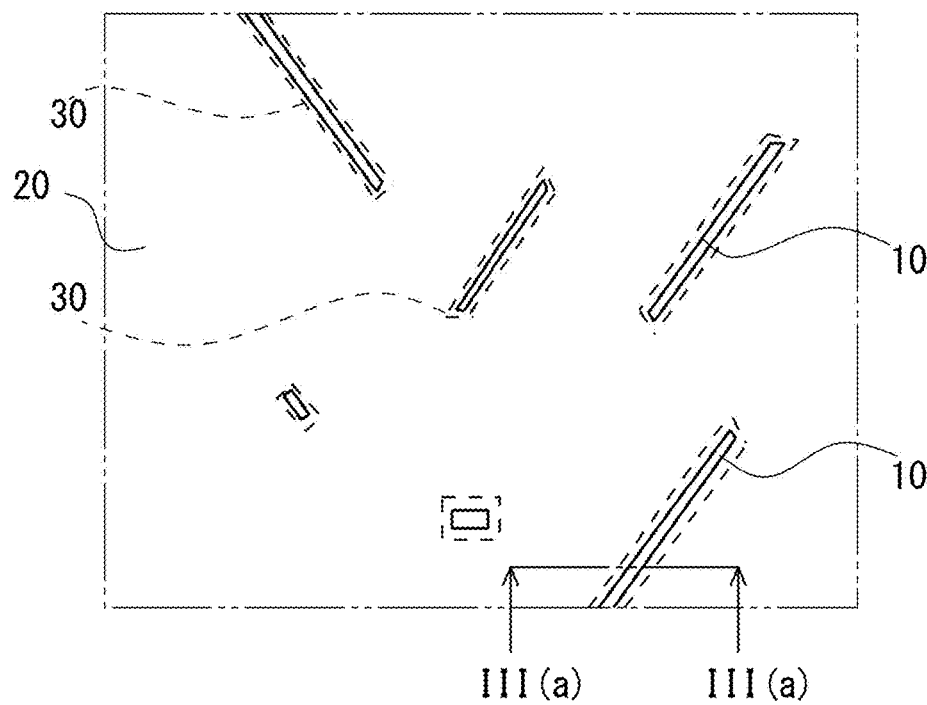
Figure 3A:
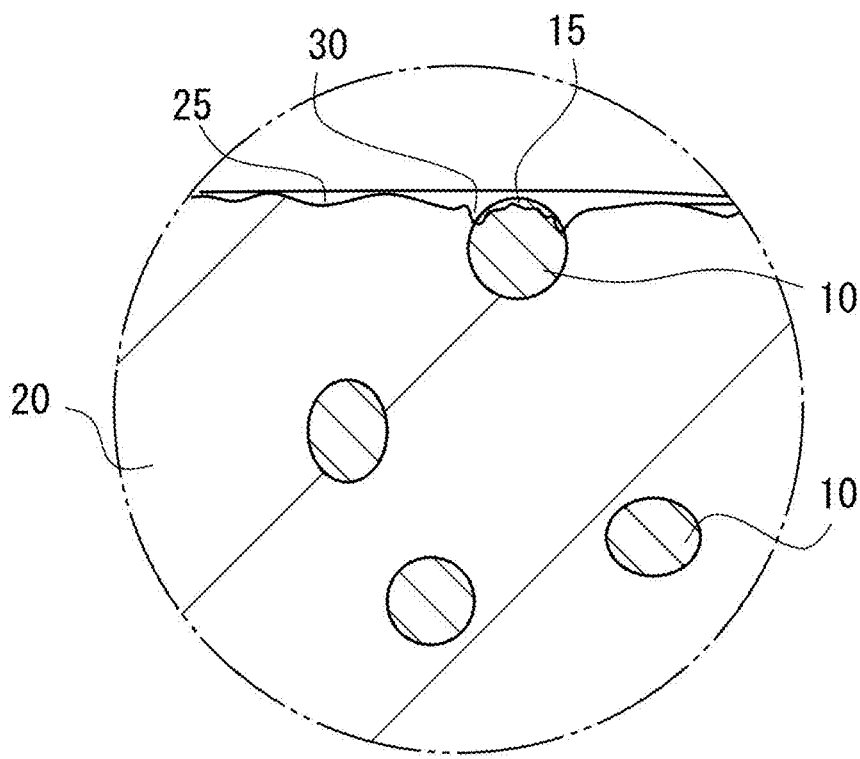
FIG. 3(a) is a schematic partial cross-sectional view of a resin base in which embrittled regions are formed, schematically illustrating a schematic cross-section taken along a line III(a)-III(a) in FIG. 2(b).
Figure 3B:
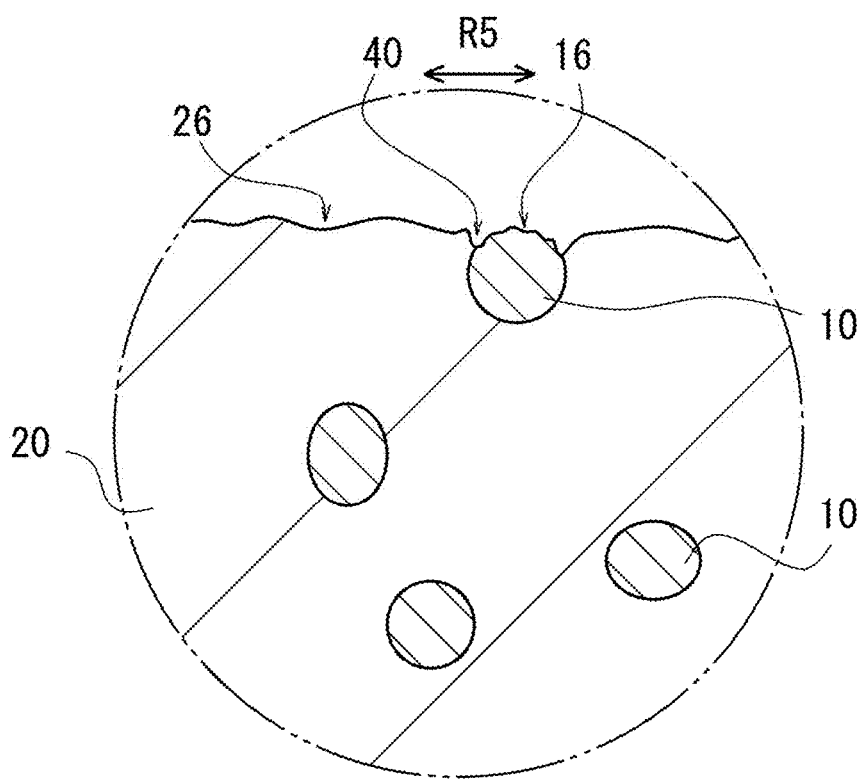
FIG. 3(b) is a schematic partial cross-sectional view of a resin base after the embrittled regions are removed.
Figure 4A:
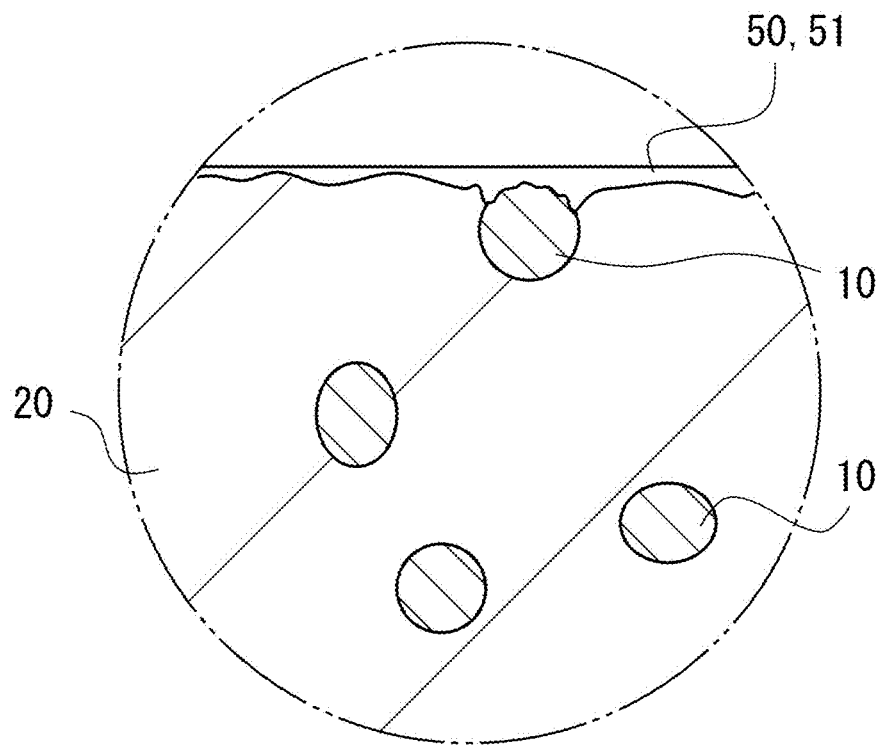
FIG. 4(a) is a schematic partial cross-sectional view of a resin base on which a plating film is formed through electroless plating.
Figure 4B:
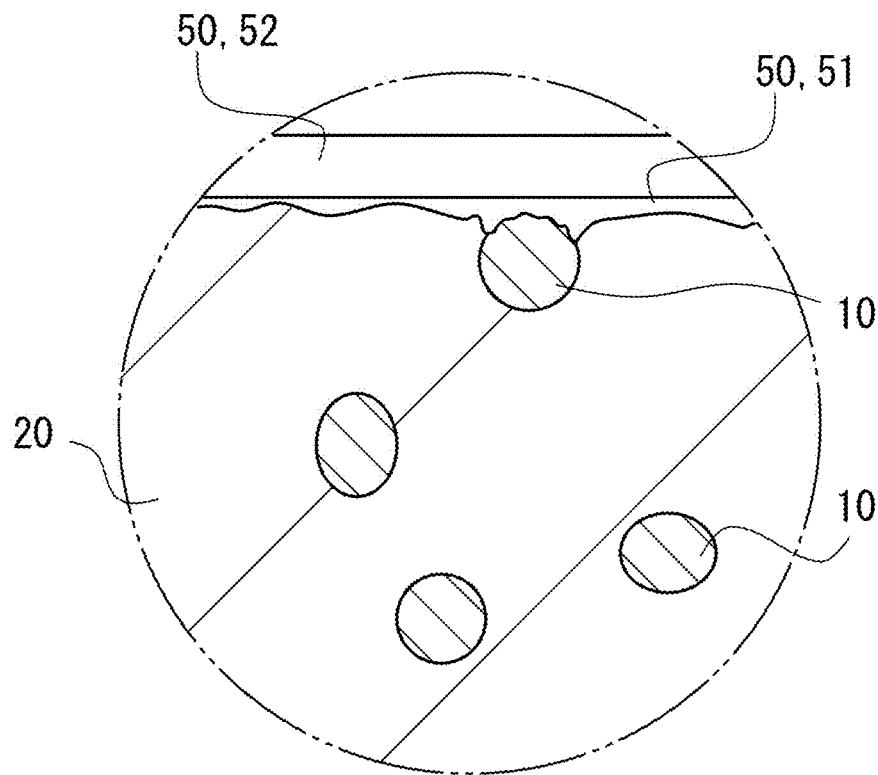
FIG. 4 (b) is a schematic partial cross-sectional view of a resin base on which a plating film is additionally formed by electroplating.
Figure 5:
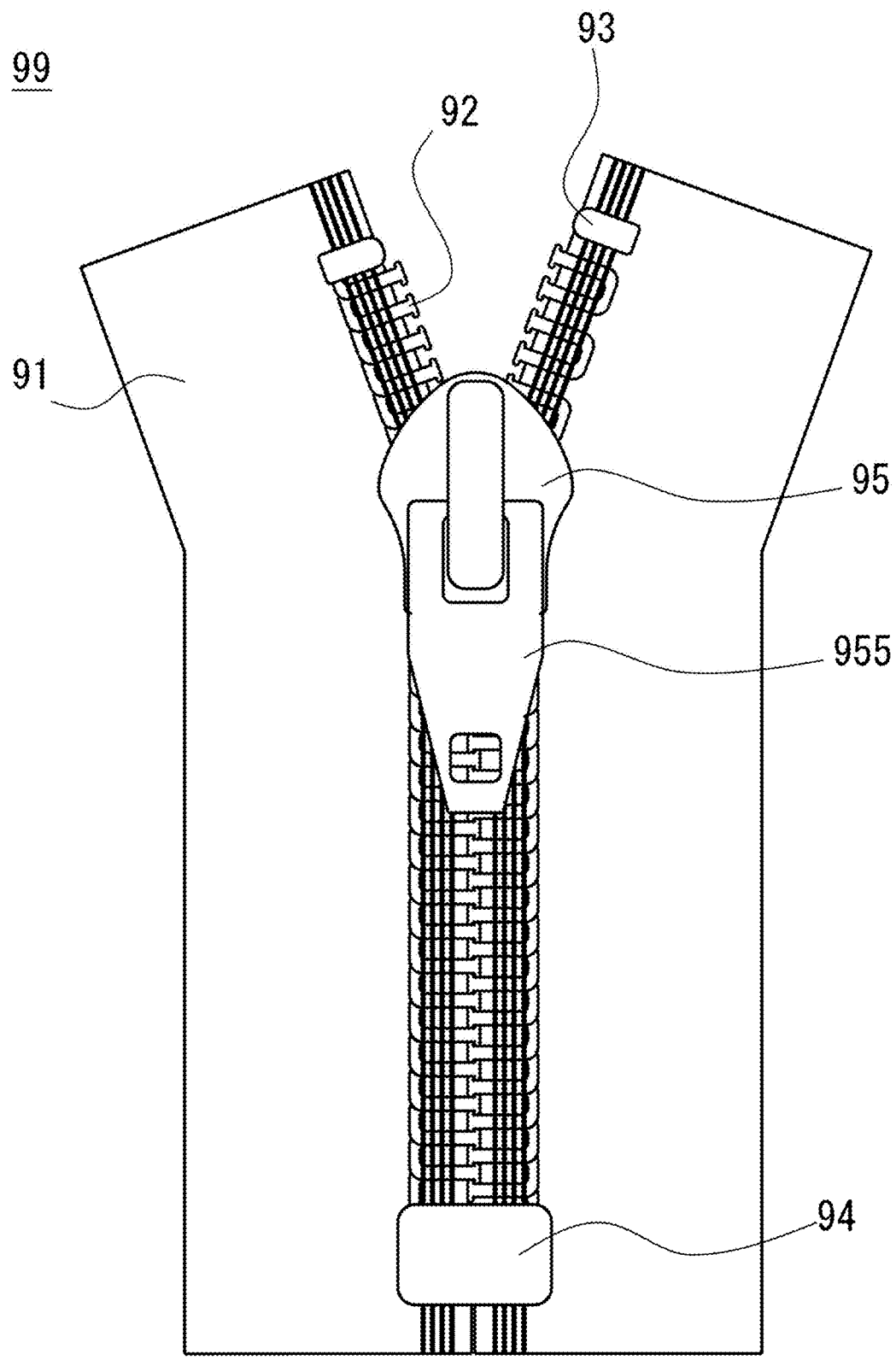
FIG. 5 is a schematic elevational view of a slide fastener according to an exemplary embodiment of the present disclosure.
Figure 6:
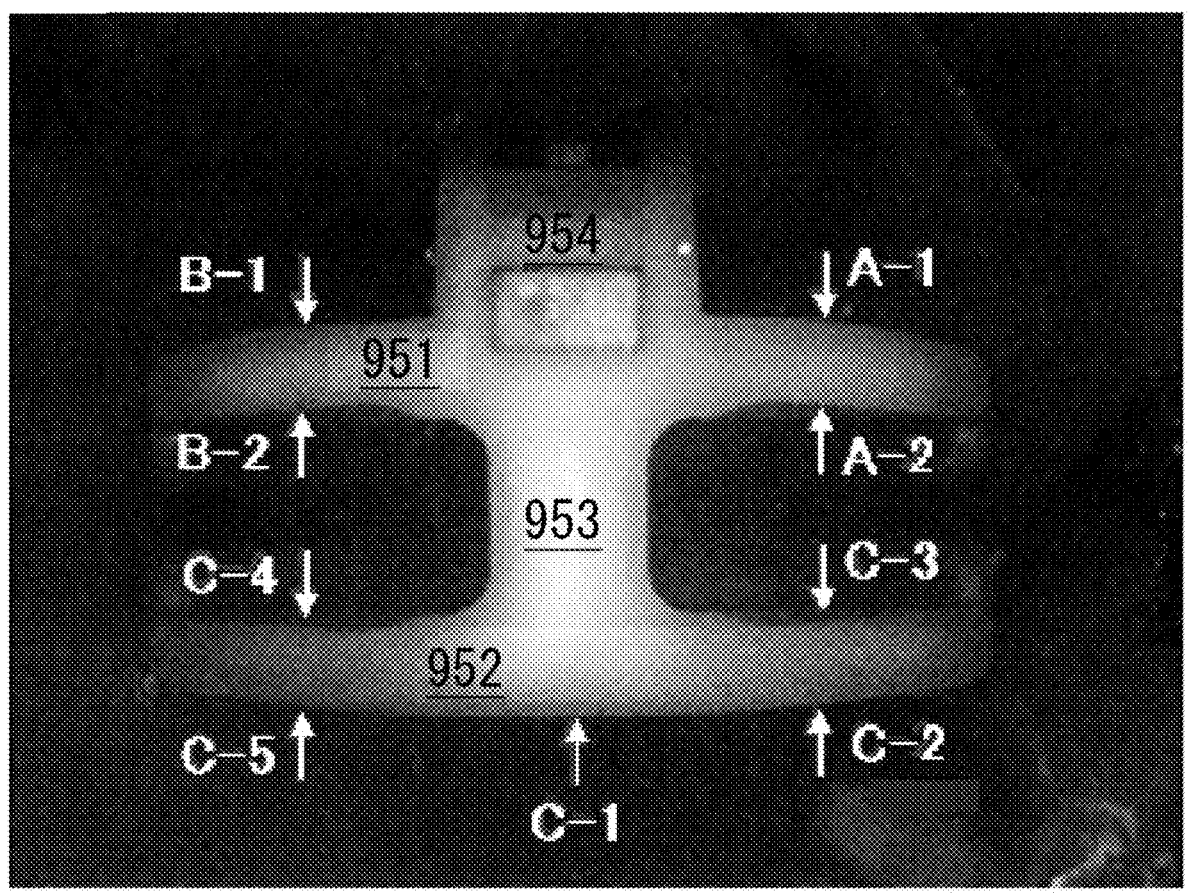
FIG. 6 is a schematic view of a slider according to a working example 1, illustrating positions where partial cross-sectional images shown in FIGS. 7-9 are taken.
Figure 7:
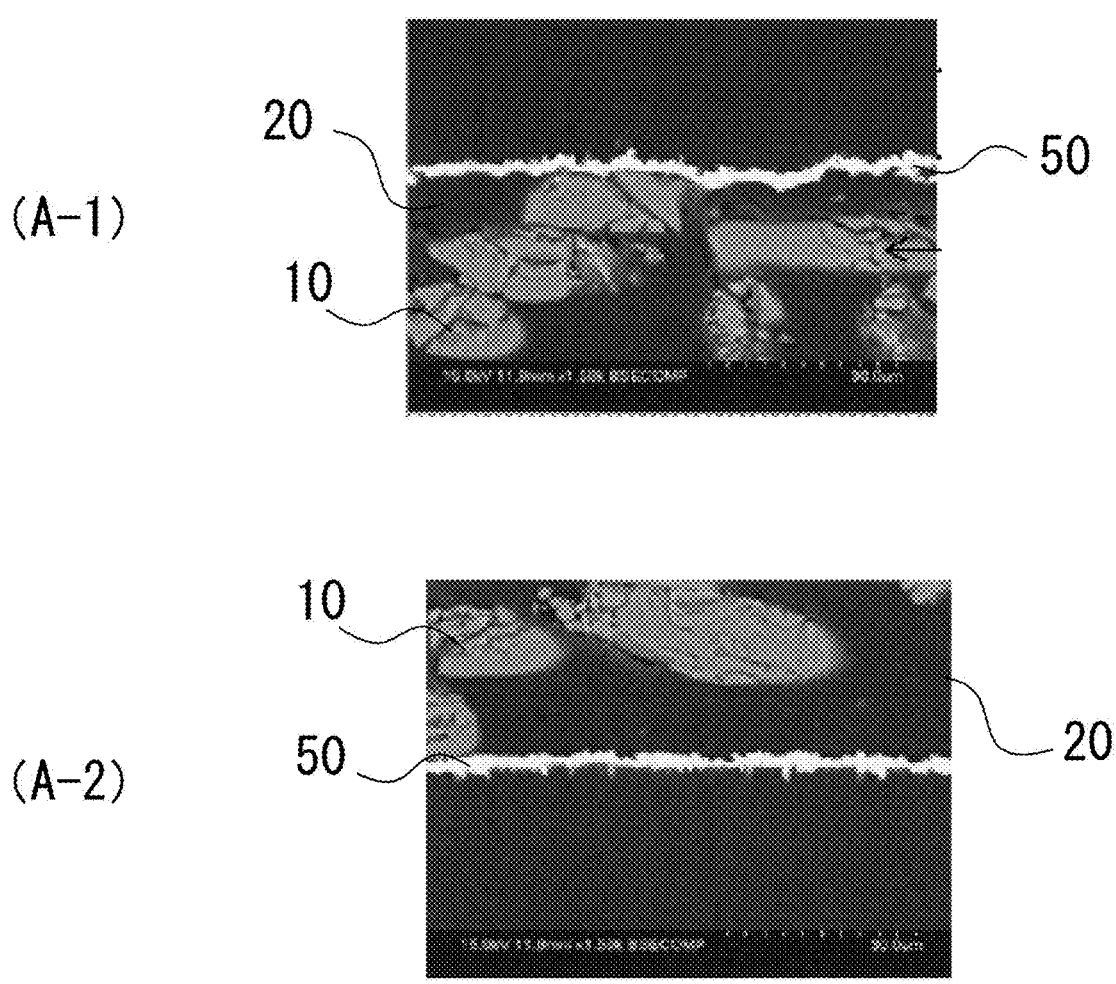
FIG. 7 shows partial cross-sectional images of a slider taken at positions A-1 and A-2 in FIG. 6.
Figure 8:
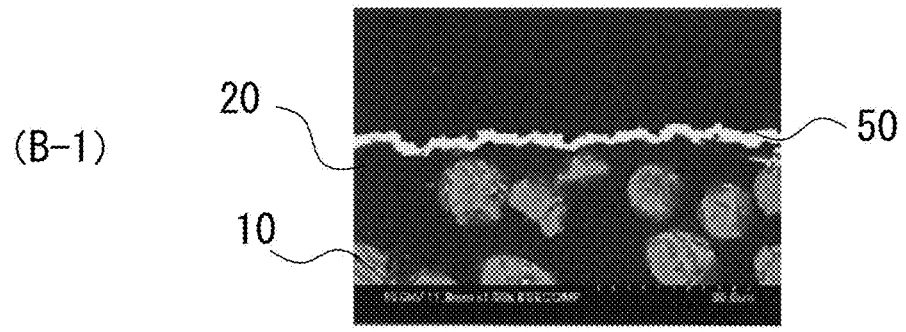
FIG. 8 shows partial cross-sectional images of a slider taken at positions B-1, B-2, C-1, and C-2 in FIG. 6.
Figure 8:
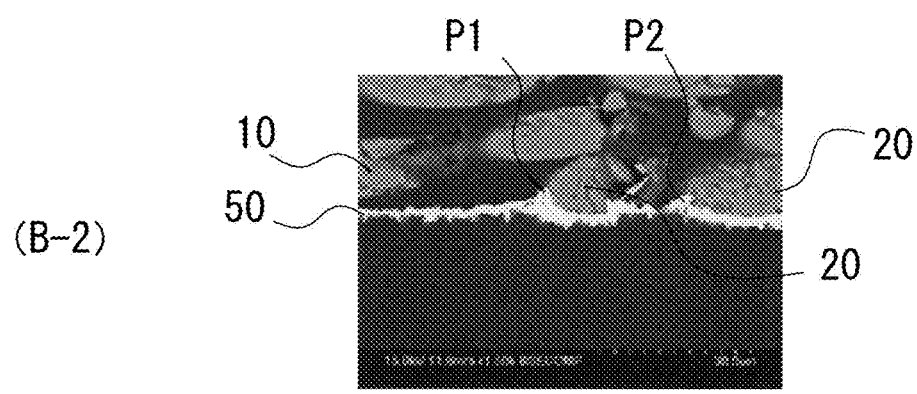
Figure 8:
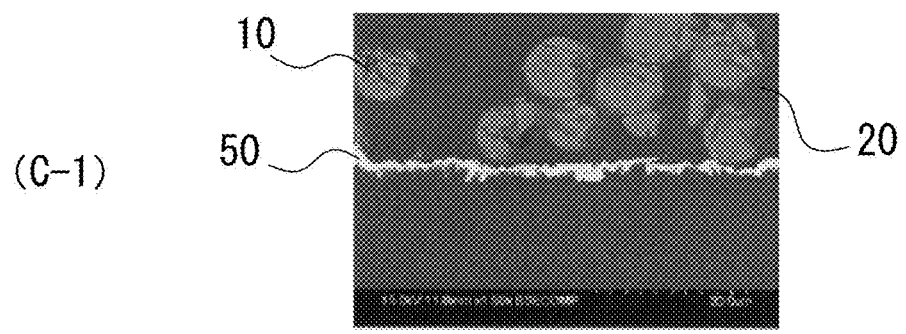
Figure 8:
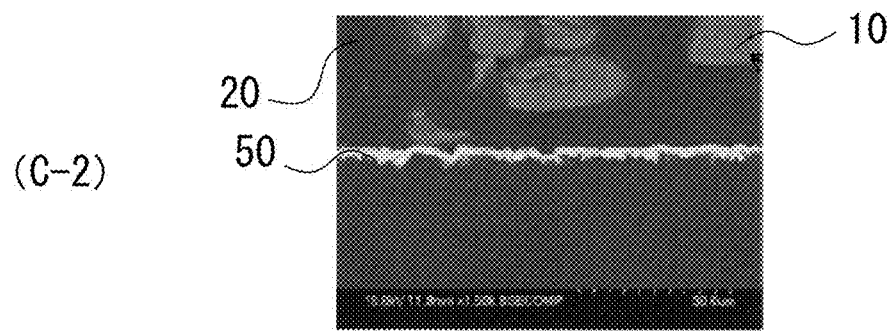
Figure 9:
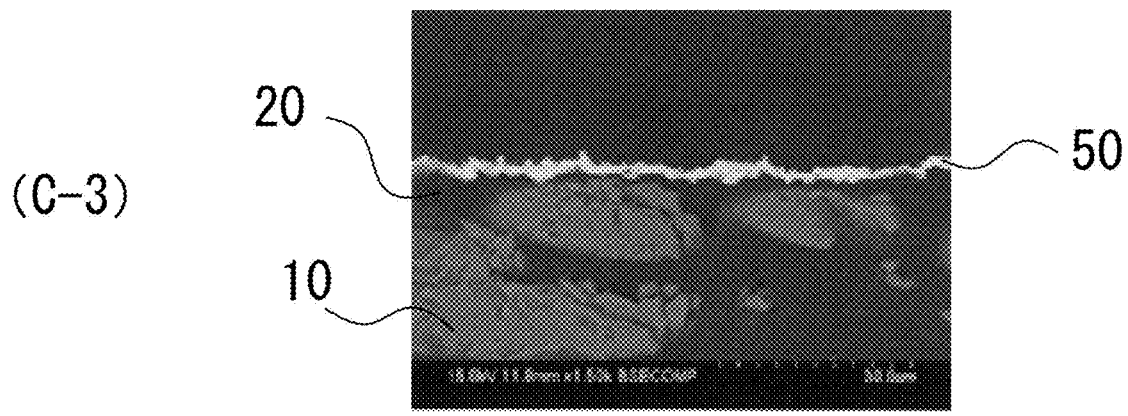
FIG. 9 shows a partial cross-sectional images of a slider taken at positions C-3, C-4, and C-5 in FIG. 6.
Figure 9:
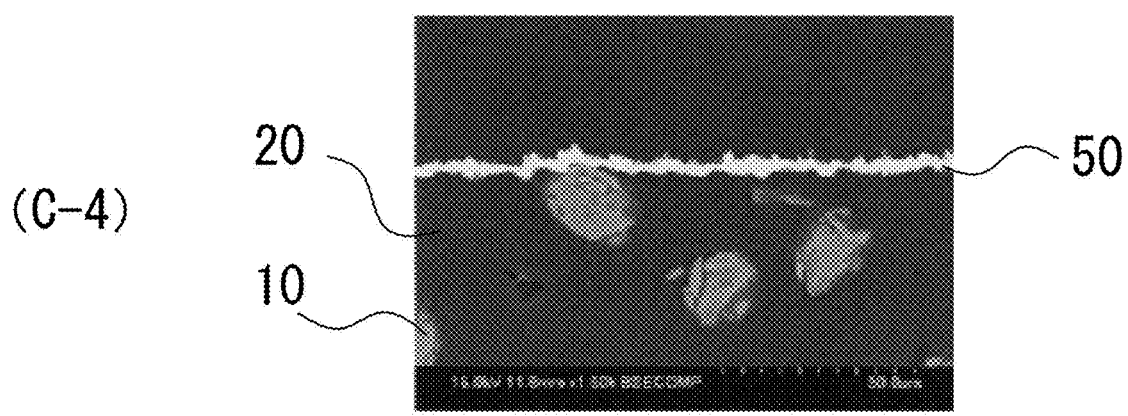
Figure 9:
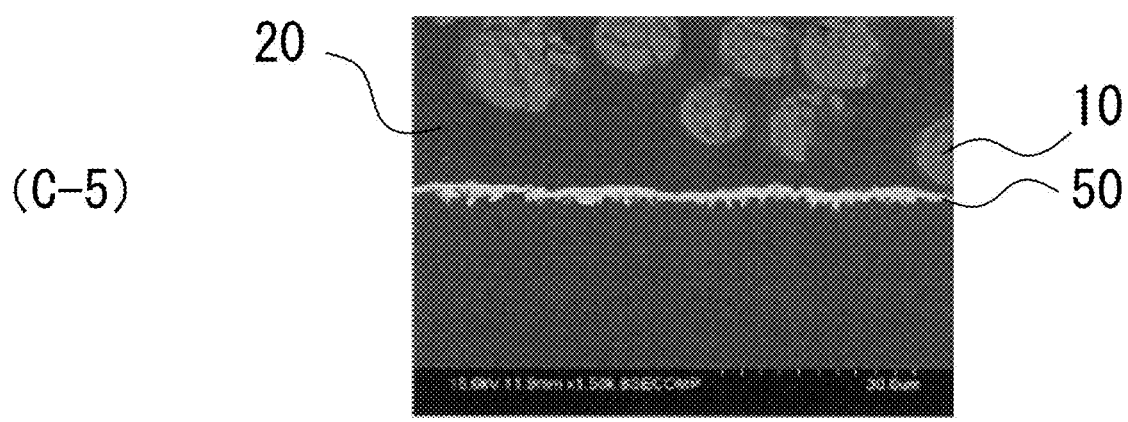
Figure 10A:
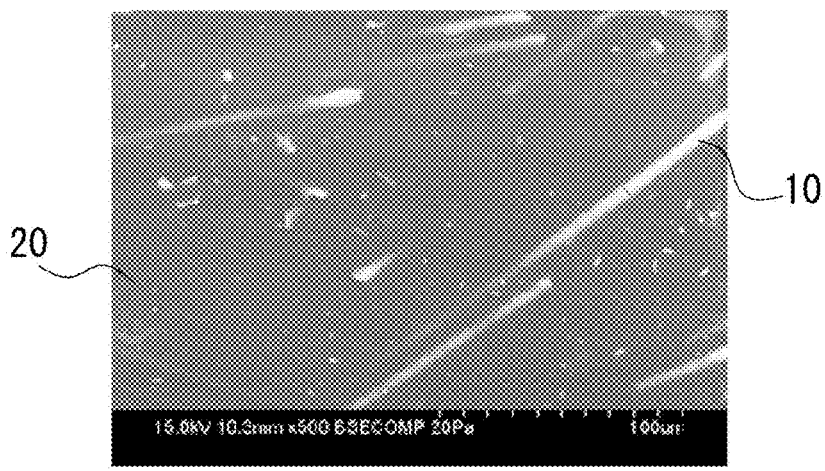
FIG. 10 includes images each showing a surface of a slider before a plating film is formed according to a working example 1.
FIG. 10(b) and FIG. 10(c) show surfaces of the resin base after embrittled regions are formed and after embrittled regions are removed, respectively.
Figure 10B:
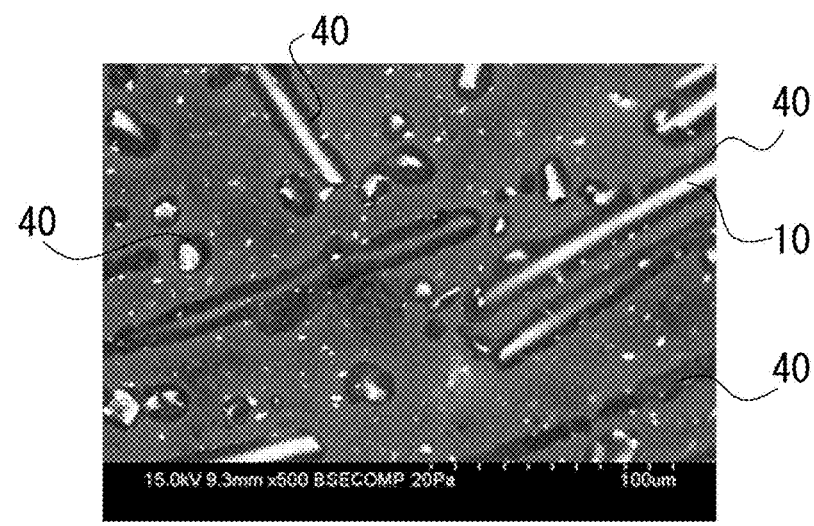
Figure 10C:
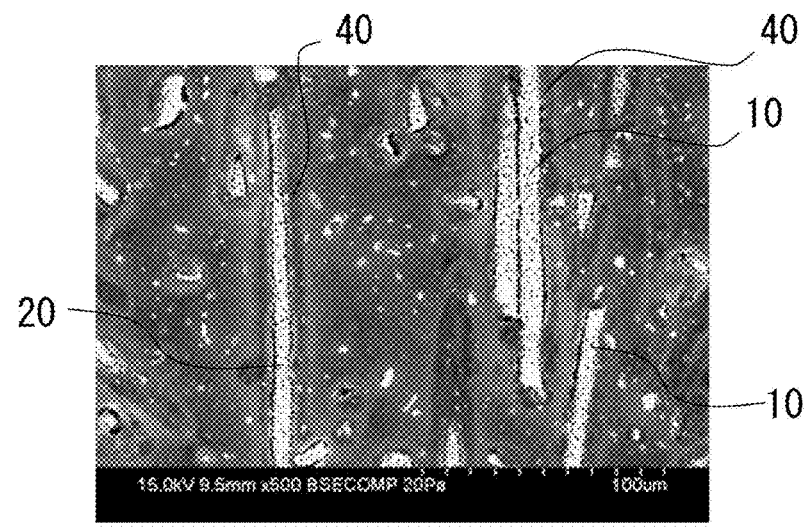
Figure 11A:
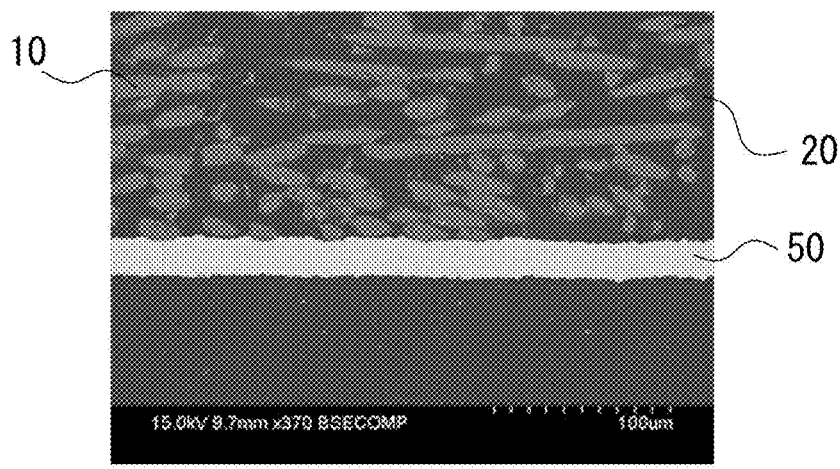
FIG. 11 includes images each showing a partial cross-section of a slider after a plating film is formed according to a working example 1.
Figure 11B:
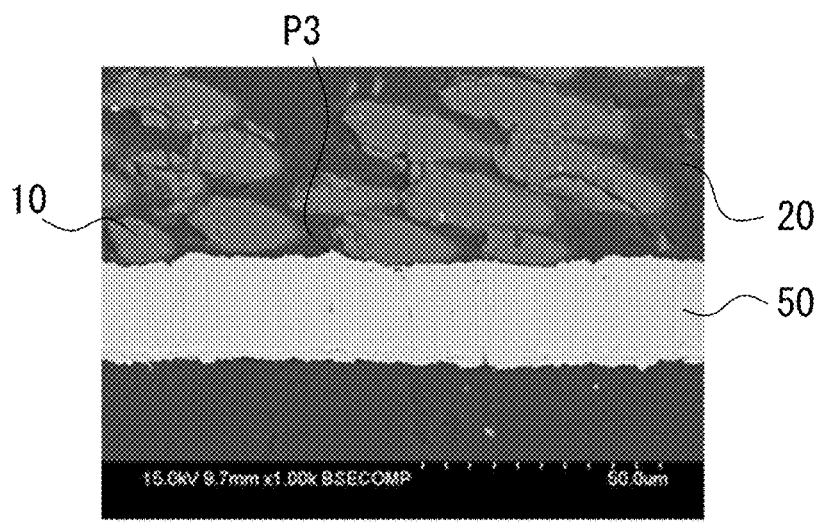

FIG. 1 is a schematic flowchart for a method of producing a film-attached resin base and a method of producing a film according to an exemplary embodiment of the present disclosure. FIG. 2 (a) is a schematic view of a surface of a resin base. FIG. 2 (b) schematic view of a surface of a resin base where embrittled regions are formed. FIG. 3(a) is a schematic partial cross-sectional view of a resin base in which embrittled regions are formed, schematically illustrating a schematic cross-section taken along a line III(a)-III(a) in FIG. 2(b). FIG. 3(b) is a schematic partial cross-sectional view of a resin base after the embrittled regions are removed. FIG. 4(a) is a schematic partial cross-sectional view of a resin base on which a plating film is formed through electroless plating. FIG. 4 (b) is a schematic partial cross-sectional view of a resin base on which a plating film is additionally formed by electroplating. FIG. 5 is a schematic elevational view of a slide fastener according to an exemplary embodiment of the present disclosure. FIG. 6 is a schematic view of a slider according to a working example 1, illustrating positions where partial cross-sectional images shown in FIGS. 7-9 are taken. FIG. 7 shows partial cross-sectional images of a slider taken at positions A-1 and A-2 in FIG. 6. FIG. 8 shows partial cross-sectional images of a slider taken at positions B-1, B-2, C-1, and C-2 in FIG. 6. FIG. 9 shows a partial cross-sectional images of a slider taken at positions C-3, C-4, and C-5 in FIG. 6. FIG. 10 includes images each showing a surface of a slider before a plating film is formed according to a working example 1. FIG. 10 (a) shows a surface of a resin base of a slider before embrittled regions are formed. FIG. 10(b) and FIG. 10(c) show surfaces of resin base after embrittled regions are formed and after embrittled regions are removed, respectively. FIG. 11 includes images each showing a partial cross-section of a slider after a plating film is formed according to a working example 1. FIG. 11 (b) is an expanded one of FIG. 11 (a).

As shown in FIG. 1, a method of producing a film-attached resin base or a method of producing a film according to the present disclosure may include a step (S1) of supplying a surface treatment gas; a step (S2) of removing embrittled regions; and a step (S3) of forming a film (50). In the step (S1) directed for supplying the surface treatment gas, the surface treatment gas including at least fluorine gas is supplied to a resin base (20) including reinforcing fibers (10) so that embrittled regions are formed in a surface of the resin base (20) and the reinforcing fiber (10) present near the surface of the resin base (20) is modified at least partially. The term of "modified" may indicate any change in quality or state, and naturally includes an "embrittled" state. In the step (S2) directed for removing the embrittled regions, at least the embrittled regions are removed so that an uneven surface is formed on the resin base (20) and the reinforcing fiber (10) is at least partially exposed in the uneven surface. In the step (S3) directed for forming a film, a film (50) is formed onto the uneven surface of the resin base (20). The uneven surface where the reinforcing fiber (10) is partially exposed may facilitate improved adhesion of the film. It should be noted that, hereinbelow, the resin base including the reinforcing fiber may possibly be referred to as "an article to be plated".

More concrete description will follow below without any specific aim of narrowing. In the present embodiment, in the step (S1) directed for supplying a surface treatment gas, the surface treatment gas including the fluorine gas contacts the resin base so that: the surface of the resin base is almost uniformly embrittled, the reinforcing fibers present near the surface of the resin base are modified, and embrittled regions are formed. As the resin base and the reinforcing fiber are different material, the reinforcing fiber is not embrittled in the same manner as the resin base. This contributes to increased roughness of the uneven surface of the resin base after the embrittled regions of the resin base are removed. The increased roughness of the uneven surface may results in increased adhesion of the film. It should be noted that the surface treatment gas including fluorine gas should not be limited to gases mainly consisting of fluorine gas, but could include gases including quite small amount of fluorine gas.

In some cases, the removal of the embrittled regions forms deep recesses each recessed along the periphery of the partially exposed reinforcing fiber in the uneven surface, contributing to increased roughness of the uneven surface. Note that these deep recesses will be finally filled with the film. In some cases, the deep recess is relatively deeper than a recess in the uneven surface, but not necessarily limited to this though.

In an example where the reinforcing fibers are randomly dispersed in the resin base, the above-described deep recesses formed at corresponding positions to the reinforcing fibers would be arranged randomly. These randomly arranged deep recesses being filled by the film may result in increased adhesion of the film to the resin base.

As the resin base and the reinforcing fiber are different material, their manners of being modified could be different even under the same condition. For example, in one hand, a surface of the resin base is roughened to be an uneven surface and, on the other hand, the reinforcing fiber is porosified. It is not possible to conclude, but such different states of the resin base and the reinforcing fiber may contribute to increased adhesion of the film to the resin base. The state of the resin base and/or the reinforcing fiber being roughened may be referred to as a first state, and the state of the resin base and/or the reinforcing fiber being porosified may be referred to as a second state. The roughened state may indicate protrusions in a surface which can be evaluated by index of surface roughness such as arithmetic mean deviation Ra or ten point height of roughness profile Rz. The porosified state may indicate a state where a number of pores are substantially equally or randomly formed in a surface. The porosified state can be observed by using a microscope for surface observation.

In the step S1, the surface treatment gas including the fluorine gas contacts the resin base. In some cases, an article to be plated made of the resin base including the reinforcing fibers is placed in a reaction vessel, and then the surface treatment gas is supplied into the closed reaction vessel. In some cases, the reaction vessel is decompressed, and thereafter the surface treatment gas is supplied into the reaction vessel. Accordingly, the surface treatment gas can contact the surface of the resin base and can also affect the reinforcing fibers present near the surface of the resin base. If sufficient time period of reaction is secured, the surface treatment gas can sufficiently affect a skin portion of the resin base and the reinforcing fibers which exist from the surface to a given depth in the resin base. Note that, the rate of modification may vary dependent to material of the resin base and the reinforcing fiber. Also, the rate of modification may vary dependent to content of fluorine gas in the surface treatment gas, time period during which the resin base is exposed to the surface treatment gas, temperature at which the resin base is exposed to the surface treatment gas, and a condition whether pretreatment is carried out for the resin base and the reinforcing fiber. The surface treatment gas including the fluorine gas should not be limited to gasses with particular composition. In some cases, the surface treatment gas is gas mixture of fluorine gas and inert gas. The inert gas may be nitrogen gas, for example. In another case, the surface treatment gas includes oxygen gas additionally to fluorine gas and nitrogen gas.

The embrittled region may indicate a brittle region in the resin base. The embrittled regions to be removed during the step S2 directed for removing the embrittled regions may include, for example, a skin portion of the resin base which will contribute to a roughened surface of the resin base or a skin portion of the resin base directly above a reinforcing fiber which is present near the surface of the resin base. The modified portions of the reinforcing fibers may be removed either, and this would result in the porosified reinforcing fibers. By the step S2 directed for removing the embrittled regions, portions of the reinforcing fibers present near the surface of the resin base in the uneven surface of the resin base may be exposed. It should be noted that there is no need for every reinforcing fiber to be exposed. In a case where a film was formed skipping the step S2, it might be likely that, after the film was formed, peeling might take place at an interface between the embrittled region and a non-embrittled region positioned below the embrittled region. The above-described peeling may be prevented due to the step S2 during which the embrittled regions are removed, and the adhesion of the film might be improved even in a region where the reinforcing fibers are not exposed. The exposed portion of the reinforcing fiber may include modified portion that is modified by the surface treatment gas including fluorine gas. Evident appearance of projections and recesses may effectively improve the adhesion of the film to the resin base. Due to the step S2, the deep recess can be evidently caused which is recessed along the periphery of the exposed portion of the reinforcing fiber.

Method of removing the embrittled regions should not be limited to a particular method. In some cases, a dry process or a wet process is employed. In some cases, the resin base is immersed in an acidic or alkaline solution after the step S1 so that the embrittled regions are removed. The acidic solution used may include one or more acids selected from a group consisting of hydrochloric acid, sulfuric acid, and nitric acid. In a specific case, aqueous hydrochloric acid solution is used. Acid or alkali may be selected in accordance with material of the embrittled or modified region.

In the step S3, a film is formed. A method of forming a film should not be limited to a particular method. In some cases, a plating film is formed through electroless-plating. In some cases, a coating film is formed through coating. The film can be formed through other various methods. It should be noted that the plating film may be a metal film. The coating film may be a resin film. Wide varieties of resin can be used such as polyurethane resin and epoxy resin, for example. The resin film may include inorganic pigments. The resin film may include other types of optional additives.

Conventional method may be referenced for a specific way of the electroless plating. An exemplary method includes application of catalyst, acceleration by accelerator, and electroless-plating. In more detail, through the step of applying catalyst, Pd—Sn complex may be attached to the surface of the resin base that has been processed through the step S2. Through the step of acceleration by accelerator, the Sn is removed. Through the step of electroless-plating, a metal film is deposited using palladium as a catalyst so that the plating film is formed. The plating film may be nickel, copper, cobalt, nickel alloy, copper alloy, cobalt alloy and so on, for example. The plating film may be formed to be a layer so as to flatten the uneven surface of the resin base. The plating film is formed so as to contact the exposed portion of the reinforcing fiber being exposed in the surface of the resin base. In some cases, the plating film fills the deep recess recessed along the periphery of the exposed portion of the reinforcing fiber.

Conventional method may be referenced for a specific way of the coating. An exemplary method includes immersing the article to be coated in a coating bath and then drying it. It is also envisaged that a coating film is formed onto the article to be coated based on spraying. The step of drying may be carried out by passing the coated article, in which the coating film has been formed, through a drying oven or by exposing it to heated air. The step of drying may be carried out by air-drying. Various types of coating material can be used such as oil-based paint or water-based paint.

The resin base and the reinforcing fiber discussed in the present disclosure should not be limited to a particular material. If an example is to be suggested, the resin base may include polyester, polyamide, polyolefin, acrylic resin, polycarbonate, ABS resin, AS resin, polystyrene, polyacetal, polyimide, polyamide-imide, melamine resin, urea resin, thermosetting phenolic resin, thermosetting epoxy resin, or thermosetting xylene resin and so on. Polyester may include polyethylene terephthalate, polybutylene terephthalate and so on. The polyamide includes nylon 6, nylon 11, nylon 12, nylon 66, nylon 610, nylon 46, polyamide 6T, polyamide 6I, polyamide MXD 6. Polyolefin includes polyethylene, polypropylene, ethylene-propylene copolymer. Other material not listed here can be employed. The reinforcing fiber may be one selected from a group consisting of glass fiber, carbon fiber, boron fiber, aramid fiber, polyethylene fiber, and zylon (trademark).

It might be preferable that the reinforcing fibers are distributed at least near the surface of the resin base. However, it would be simple and easy to distribute the reinforcing fibers in the entirety of the resin base, and the strength of the resin base would be increased accordingly. In some cases, glass fibers are employed as reinforcing fibers. The resin base may include 10 to 60 mass percent of the glass fibers. The resin base may include the glass fibers having mass percent greater than 30. Appropriate amount of glass fibers may be included in the resin base such that appropriate amount of glass fibers are present near the surface of the resin base. In a case where the resin base includes the glass fibers as the reinforcing fibers, the glass fibers present near the surface of the resin base would be advantageously, at least partially porosified with the surface treatment gas including fluorine gas.

In some cases, the reinforcing fibers dispersed in the resin base may have a diameter of 1 to 30 μm and a length of 10 to 300 μm. Preferably, the reinforcing fiber may have a diameter equal to or greater than 5 μm or 7 μm or 10 μm. Preferably, the reinforcing fiber may have a diameter equal to or less than 20 μm or 17 μm or 15 μm. Preferably, the reinforcing fiber may have a length equal to or greater than 100 μm or 140 μm or 180 μm. Preferably, the reinforcing fiber may have a length equal to or less than 250 μm or 230 μm or 210 μm. In a case where the glass fiber is employed as a reinforcing fiber, composition of glass may include $SiO_2$ or $Al_2O_3$ and so on, and its melting temperature may be 840° C. (a softening point), for example.

Supplemental description for the above-described methods will follow with reference to FIGS. 2 to 4. As shown in FIG. 2 (a), plural reinforcing fibers 10 are present randomly nearby the surface of the resin base 20. The reinforcing fiber 10 may be a glass fiber having a diameter of 5 to 20 μm and a length of 100 to 250 μm, for example. A method of dispersing the reinforcing fibers 10 in the resin base 20 can be carried out in accordance with a widely known method. Normally, it is achieved by dispersing the reinforcing fibers in the melted resin material. A stirring tank can be used which includes an impeller for stirring. The resin base may be obtained through an injection molding of resin to which the reinforcing fibers have been added, for example. If the reinforcing fiber is too big, molding of the resin base may not be done well. Also, if the reinforcing fiber is too small, arithmetic mean deviation Ra in the uneven surface of the resin base described below may be smaller and sufficient adhesion strength of film may not be obtained.

When the resin base 20 is exposed to the surface treatment gas including fluorine gas, the surface of the resin base 20 is uniformly embrittled and the embrittled regions 25 are formed. Removal of the embrittled regions 25 forms uneven surface 26 in the surface of the resin base 20. The reinforcing fiber 10 may not be embrittled similar to the resin base 20, and may be modified, e.g. porosified.

In some cases, a deep embrittled region 30 is formed near the reinforcing fiber 10, i.e. along the reinforcing fiber 10. The deep embrittled region 30 is formed along the reinforcing fiber 10 present near the surface of the resin base 20 as shown in FIG. 2 (b). The lengths or sizes of the reinforcing fibers 10 present near the surface of the resin base 20 could be random. Therefore, the deep embrittled regions 30 with random sizes and lengths would be formed. As shown in FIG. 3 (a), the deep embrittled region 30 extends deeper along the periphery of the reinforcing fiber 10. The deep embrittled region 30 may be formed near or directly above the reinforcing fiber 10 buried at shallow depth from the surface of the resin base 20, and may include a portion recessed along the periphery of the reinforcing fiber 10.

As would be understood from comparison between FIGS. 3 (a) and (b), after the deep embrittled region 30 nearby the reinforcing fiber 10 is removed, the deep recess 40 is formed nearby the exposed portion of the reinforcing fiber 10. The deep recess 40 is formed along the exposed portion of the reinforcing fiber 10 in a plane, and is formed to extend toward a deep portion along the periphery of the exposed portion of the reinforcing fiber 10 in a cross-section.

As would be understood from FIG. 3 (a), by the step 1, the skin portion 15 of the reinforcing fiber 10 may be modified. As would be understood from FIG. 3 (b), by the step 2, this modified region would also be removed. As a result, a multiplicity of pores 16 may be formed in the exposed portion of the reinforcing fiber 10.

In some cases, arithmetic mean deviation Ra in the uneven surface 26 of the resin base 20 is between 0.2 to 1.0 μm. In some cases, the arithmetic mean deviation Ra is equal to or greater than 0.2 μm or 0.3 μm or 0.4 μm. In some cases, arithmetic mean deviation Ra is equal to or less than 1.0 µm or 0.9 µm or 0.8 µm. Measurement of the arithmetic mean deviation Ra should be based on NIST standard, and a non-contact three-dimensional surface shape measuring device "Zygo New View 6300" produced in 2007 by zygo company in the united states could be used.

As would be understood from FIG. 3 (b), the deep recess 40 has a certain depth. In some cases, arithmetic mean deviation Ra is between 0.3 to 2.0 µm in a range crossing the deep recess 40, e.g. a range R5 shown in FIG. 3 (b). In some cases, the arithmetic mean deviation Ra is equal to or greater than 0.3 µm or 0.4 µm or 0.5 µm. In some cases, the arithmetic mean deviation Ra is equal to or less than 2.5 µm or 2.2 µm or 2.1 µm. Measurement of the arithmetic mean deviation Ra should be based on NIST standard, and a non-contact three-dimensional surface shape measuring device "Zygo New View 6300" produced in 2007 by zygo company in the united states should be used.

After the deep embrittled regions 30 are removed, a film is formed onto the surface of the resin base 20 by the step S3. In a case illustrated in FIG. 4, the film is a plating film. This plating film is formed through steps of electroless-plating and electroplating. That is, the plating film includes a first plating layer 51 formed by electroless-plating and a second plating layer 52 formed by electro-plating. The first and second plating layers 51, 52 should not be limited to the same metal and could be different metal. In some cases, the thickness of the second plating layer 52 is greater than the thickness of the first plating layer 51. Widely known methods may be referenced for respective conditions for electroless-plating and electroplating.

After the step S3, post-treatment may be carried out if required. The post-treatment may include annealing, polishing and so on.

A film-attached resin base produced by a method according to the present disclosure may include: a resin base 20 including reinforcing fibers 10 and being provided with an uneven surface where the reinforcing fiber 10 partially emerge; and a film 50 formed on the uneven surface of the resin base 20. Emergence of the reinforcing fibers 10 from the resin base 20 would increase roughness of the uneven surface of the resin base 20 and would increase an ability of adhering of the film 50. In an interface between the resin base 20 and the film 50, the reinforcing fibers 10 may exist randomly. This may contribute to increased adhesion of the film 50. In some cases, the film 50 may fill the deep recess 40 recessed along the periphery of the reinforcing fiber 10 that is partially exposed in the uneven surface. This may contribute to increased adhesion of the film 50.

In an interface between the resin base 20 and the film 50, the reinforcing fibers 10 may exist randomly. This may contribute to random arrangement of the deep recesses 40. The exposed lengths of the reinforcing fibers 10 may be different one another as would be seen in FIG. 2(b), and may range from 1 to 200 µm, for example. It should be noted that a claimed film-attached resin base should not be limited to one which is produced by a method according to the present disclosure or as identified in claims.

A skilled person in the art would appreciate the advantage of embedded reinforcing fibers 10 in the resin base 20 for the sake of increasing the roughness of the uneven surface of the resin base 20 or for forming the randomly differently sized deep recesses 40. Note that, glass itself, an example material of the reinforcing fiber 10, has a low adhesion to a metal. In some cases, in a state after the film is removed, the resin base 20 includes 10 to 60 mass percent of glass fibers. In one case, in a state after the film is removed, the resin base 20 includes glass fibers having mass percent greater than 30. For a film-attached resin base obtained according to the presently disclose method, a method for removing the film off the resin base may include melting the resin so as to separate the metal off the resin, for example.

In some cases, the reinforcing fiber 10 present near the interface between the resin base 20 and the film 50 is at least partially porosified. For example, 1 to 50 pores are formed in a square of 13 µm×13 µm in a porosified reinforcing fiber 10. In some cases, the film 50 contacts the reinforcing fiber 10 present near the interface between the resin base 20 and the film 50. This may contribute in increased adhesion of the film 50 to the glass fiber, an example of the reinforcing fiber 10.

A film-attached resin base produced by a method according to the present disclosure may be a sliding part, not necessarily limited to this through. The sliding part indicates one of parts that rub one another, i.e. move while touching one another. It is requested, particularly for the sliding part, to firmly adhere the film to the resin base.

A film-attached resin base produced by a method according to the present disclosure may be a slider 95 of a slide fastener. As shown in FIG. 5, the slider may be a sliding part for opening and closing a slide fastener 99 based on the movement of slider. The slide fastener 99 includes a left-right pair of fastener tapes 91, fastener elements 92 provided on opposed edges of respective fastener tapes 91, a left-right pair of front stops 93 provided at the front ends of the fastener elements 92, a rear stop 94 common in the left and right sides provided at the rear end of the fastener elements 92, and the slider 95. As widely known, the slider may include a top wing, a bottom wing, a coupling pillar that couples the top wing and the bottom wing at the front end portion, a pull-tab attachment pillar provided on the top wing, and a pull tab 955 attached to the pull-tab attachment pillar. The fastener tape 91 may be a flexible cloth and may be a woven fabric or knitted fabric or combination thereof. A coil-like element is illustrated as the fastener element 92, but should not be limited to this. The fastener element 92 can be a resin-made or metal-made elements.

When the slider 95 moves frontward or rearward, each left or right fastener element 92 touches the slider, i.e. the top wing, the bottom wing or the coupling pillar; and the fastener element and the top wing, the bottom wing, or the coupling pillar rub one another. If the slider is made of metal, sufficient mechanical strength thereof would be secured, but the slider would be heavier. In contrast, if the slider is made of resin, then reduction of weight of slider would be facilitated, but the mechanical strength of slider would be lowered. By covering the resin base of the slider by the film based on a method according to the present disclosure, it would be possible to supply the slider covered by the film which can endure repeated friction with the fastener elements. In a case where the film is formed through electroless-plating, the film can be formed relatively uniformly inside the slider, e.g. on the opposed surfaces of the top and bottom wings and an outer circumference of the coupling pillar.

Working Examples

In working examples 1 to 3 and comparative examples 1 to 2, I attempted to form a plating film onto a resin base. In the working example 1, a resin base consisting of polyamide (PA) with glass fibers having 13 µm diameter*200 µm length being dispersed therein was used as an article to be plated. The polyamide resin base included 60 mass percent of glass fibers dispersed therein. A surface treatment gas used for surface treatment of the article to be plated was gas mixture of fluorine and nitrogen. Volume ratio of the mixture was fluorine/nitrogen=15 vol. %/85 vol. %. At the step S1, the article to be plated was subjected to surface treatment gas in a reaction vessel under a condition of 25° C. and 30 minutes. The step 1 was then followed by immersing the article to be plated into a hydrochloric acid bath at 30° C. The hydrochloric acid bath included 200 mL of hydrochloric acid per 1 litre of aqueous hydrochloric acid. After the immersion, the surface of the article to be plated was washed in alkaline-degreasing-step using 50 g/L of aqueous sodium hydroxide. Next, electroless-copper-plating was applied to the article to be plated, and this was followed by electroplating. In the electroless-copper-plating, the article to be plated was firstly immersed in a bath of surfactant at 50° C. for 3 minutes. Then, the article to be plated was immersed for 3 minutes in a 40° C. bath including 35 vol. % of aqueous hydrochloric acid and Pd—Sn complex such that Pd catalysts were attached thereto. Boric acid was then added to the hydrochloric acid bath as a reducer, and the bath was left unchanged for another 1 minute under the same condition at 40° C. The article to be plated was then immersed for 7 minutes in an electroless-plating bath including formalin copper at 50° C. The article to be plated was then immersed in an electroplating bath at 25° C. including copper sulfate, and power was supplied for 450 minutes so that a plating layer was formed thereon.

In the working example 2, polyacetal (POM) was used as material of the resin base. The polyacetal resin base included 30 mass percent of glass fibers dispersed therein. The surface treatment gas included 5 vol. % of fluorine gas. Exposure time period for the article to be plated was 20 minutes. Other conditions were the same as the working example 1.

In the working example 3, polypropylene (PP) was used as material of the resin base. The polypropylene resin base included 10 mass percent of glass fibers dispersed therein. The surface treatment gas included 2 vol. % of fluorine gas. Exposure time period for the article to be plated was 10 minutes. Other conditions were the same as the working example 1.

As shown in Chart 1, in the working examples 1-3, sufficient peel strength was obtained for the plating film off the resin base. Peel strength was measured based on JIS C5012 mechanical characteristic test. In particular, peel strength of the plating film was measured by AGS-H, a product of SHIMAZU corporation.

CHART 1

| Example | Material | Glass fibers (φ13 μm*Length200 μm) | Surface treatment gas | Immersion to hydrochloric acid | Deposition of plating film | Peel Strength |
| --- | --- | --- | --- | --- | --- | --- |
| Example 1 | PA | 60 mass % | $F_2$: 15 vol. % $N_2$: 85 vol. % 25° C. × 30 min | 200 ml/L 30° C. × 10 min | GOOD | 1 kN/m |
| Example 2 | POM | 30 mass % | $F_2$: 5 vol. % $N_2$: 95 vol. % 25° C. × 20 min | 200 ml/L 30° C. × 10 min | GOOD | 0.4 kN/m |
| Example 3 | PP | 10 mass % | $F_2$: 2 vol. % $N_2$: 98 vol. % 25° C. × 10 min | 200 ml/L 30° C. × 10 min | GOOD | 0.4 kN/m |
| Com. Example 1 | POM | None | $F_2$: 5 vol. % $N_2$: 95 vol. % 25° C. × 20 min | 200 ml/L 30° C. × 10 min | NO GOOD | NA |
| Com. Example 2 | POM | None | $F_2$: 5 vol. % $N_2$: 95 vol. % 25° C. × 20 min | Skipped | NO GOOD | NA |
| Ref. Example 1 | PA | 60 mass % | $F_2$: 15 vol. % $N_2$: 85 vol. % 25° C. × 30 min | Skipped | GOOD | 0.3 kN/m |

In the comparative example 1, polyacetal (POM) was used as material of the resin base. In the comparative example 1, the resin base not including reinforcing fibers was used as an article to be plated. Composition and condition of surface treatment gas were the same as those in the working example 2. Likewise the working example 2, the article to be plated was exposed to a surface treatment gas including fluorine gas and was immersed into hydrochloric acid bath, and then electroless-copper-plating was carried out. Unlike the working examples 1-3, no copper plating film was deposited.

In the comparative example 2, unlike the comparative example 1, electroless-copper-plating was carrier out for the article to be plated which had been exposed to a surface treatment gas including fluorine gas but not had been immersed into a hydrochloric acid bath. Other conditions were the same as the comparative example 1. Similar to the comparative example 1, no copper plating film was deposited in the comparative example 2.

In the reference example 1, unlike the working example 1, electroless-copper-plating was carried out for the article to be plated which had been exposed to a surface treatment gas including fluorine gas but not had been immersed into a hydrochloric acid bath. Other conditions were the same as the working example 1. The reference example 1 resulted in lower peel strength than the working examples 1-3 regardless of the same condition as the working example 1 except for the immersion to hydrochloric acid bath. This proved the importance of immersion into hydrochloric acid bath.

With reference to FIGS. 6 to 11, an example will be discussed where a resin-made slider is used as an article to be plated. It should be noted that the same steps and conditions were employed as the working example 1 for forming a plating film onto a resin-made slider.

The SEM picture shown in FIG. 7 (A-1) illustrates a cross-sectional view of the top surface portion of the top wing 951 at a position indicated by an arrow A-1 in FIG. 6, i.e. a position being away from the coupling pillar 953 in the left-right direction. The SEM picture shown in FIG. 7 (A-2) illustrates a cross-sectional view of the opposed inner surface portion of the top wing 951 at a position indicated by an arrow A-2 in FIG. 6, i.e. a position being away from the coupling pillar 953 in the left-right direction. The opposed inner surface of the top wing 951 is a surface of the top wing 951 facing the bottom wing 952.

The (B-1)-(C-5) SEM pictures shown in FIGS. 8-9 similarly illustrate cross-sectional views at positions indicated by arrows B-1 to C-5 in FIG. 6. The (B-1) and (B-2) SEM pictures illustrate cross-sectional views of the top and opposed inner surface portions of the top wing 951 at positions opposite to the positions where the (A-1) and (A-2) SEM pictures were taken, sandwiching the pull-attachment column 954 at the center in the left-right direction. The (C-1) SEM picture illustrates a cross-sectional view of the bottom surface portion of the bottom wing positioned directly under the coupling pillar 953. The (C-2) SEM picture illustrates a cross-sectional view of the bottom surface portion of the bottom wing 952 positioned away from the coupling pillar 953 in the left-right direction. The (C-3) SEM picture illustrates a cross-sectional view of the opposed inner surface portion of the bottom wing 952 positioned away from the coupling pillar 953 in the left-right direction. The (C-5) and (C-4) SEM pictures illustrate cross-sectional views of the bottom and opposed inner surface portions of the bottom wing 952 at positions opposite to the positions where the (C-2) and (C-3) SEM pictures were taken, sandwiching the pull-attachment column 954 at the center in the left-right direction.

As shown in FIGS. 7 to 9, the plating film 50 with uniform thickness was formed on the resin base of the slider. As shown in FIGS. 7 to 9, the surface of the resin base 20 was entirely roughened so that uneven surface was formed. As clearly shown in the (B-2) SEM picture, the plating film 50 touches the exposed portion of the glass fiber in the surface of the resin base 20 and also covers this exposed portion. A deep recess adjacent to the exposed portion of the glass fiber could be observed as being filled by the copper plating film. This deep recess was formed by the removal of the embrittled region of the resin base 20. The positions P1 and P2 clearly point out the deep recesses that are recessed along the periphery of the reinforcing fiber 10 being filled by the copper plating film. As shown in (C-5) SEM picture, there may be a region where the no glass fiber is exposed. After the embrittled region formed by the step S1 was removed by the step S2, the plating film was formed by the step S3. This prevents peel from being caused at an interface between the embrittled region and the underneath non-embrittled region, thus increasing adhesion of the plating film even in the region where no glass fiber is exposed.

FIG. 10 (a) shows a surface of resin base of slider before embrittled regions are formed. FIGS. 10 (b) and 10 (c) shows a surface of resin base of slider after embrittled regions are formed and removed. As would be understood from FIG. 10, adjacent regions of the glass fibers randomly existing in the surface of resin base of slider are intensively etched by surface treatment gas including fluorine gas so that deep recesses are intensively formed adjacent to the glass fibers. Also, as would be seen in FIG. 10(c), the exposed portions of the glass fibers are porosified.

The SEM pictures in FIG. 11 show cross-sectional views of resin base of slider after the formation of copper plating film 50. It could be seen that the deep recesses are filled by the copper plating film 50. The position P3 clearly point out a deep recess that is recessed along the periphery of the reinforcing fiber 10 being filled by the copper plating film.

In the working example 4 and comparative examples 3-4, a coating film was formed onto the resin base. In the working example 4, a resin base of polyamide (PA) with glass fibers of 13 μm diameter*200 μm length being dispersed therein was used as an article to be coated. 60 mass percent of the glass fibers were dispersed in the polyamide resin base. A surface treatment gas used for surface treatment of an article to be coated was gas mixture of fluorine and nitrogen. Volume ratio of the mixture was fluorine/nitrogen=15 vol. % 85 vol. %. At the step S1, the article to be coated was subjected to surface treatment gas in a reaction vessel under a condition of 25° C. and 30 minutes. The step 1 is then followed by immersing the article to be coated into a hydrochloric acid bath at 30° C. The hydrochloric acid bath includes 200 mL of hydrochloric acid per 1 litter of aqueous hydrochloric acid. After the immersion, the surface of the article to be coated was washed in alkaline-degreasing-step using 50 g/L of aqueous sodium hydroxide. Next, the article to be coated was coated by coating, and the dried. The coating used was one in which inorganic pigments are dispersed in a resin.

In the comparative example 3, the same article to be coated was used as the working example 4, but no surface treatment using the surface treatment gas and no immersion to hydrochloric acid were conducted. In the comparative example 4, an article to be coated was used in which no reinforcing fiber is included in the resin base and, similar to the comparative example 3, no surface treatment using the surface treatment gas and no immersion to hydrochloric acid were conducted.

CHART 2

| Example | Material | Glass fibers (φ13 μm*Length200 μm) | Surface treatment gas | Immersion to hydrochloric acid | Peel Strength |
|---|---|---|---|---|---|
| Example 4 | PA | 60 mass % | $F_2$: 15 vol. %<br>$N_2$: 85 vol. %<br>25° C. × 30 min | 200 ml/L<br>30° C. × 10 min | 351 kg/cm$^2$ |
| Com. Example 3 | PA | 60 mass % | Skipped | Skipped | 280 kg/cm$^2$ |
| Com. Example 4 | PA | None | Skipped | Skipped | 298 kg/cm$^2$ |

Peel strength of the coating film off the article coated was measured based on JIS K5600-5-7. That is, peel strength of the coating film off the article coated was measured according to a pull-off method. As would be understood from comparison between the working example 4 and the comparative example 3, peel strength was incredibly enhanced due to the surface treatment and the immersion to hydrochloric acid.

Given the above teachings, a skilled person in the art would be able to add various modifications to the respective embodiments. Reference codes in Claims are just for reference and should not be referred for the purpose of narrowly construing the scope of claims. Mass percent can be replaced by weight percent. The cross-sectional shape of reinforcing fiber should not be limited to a circle or an oval, and could be a polygon such as triangle and rectangle or a star-shape.

REFERENCE SIGNS LIST

10 Reinforcing fiber
20 Resin base
30 Deep embrittled region
40 Deep recess
50 Plating film

The invention claimed is:

1. A method of producing a film-attached resin base, the method comprising:
  supplying a surface treatment gas including at least fluorine gas to a resin base in which glass fibers are dispersed so that embrittled regions of the resin base are formed in a surface of the resin base and the glass fibers present near the surface of the resin base are modified at least partially;
  removing the embrittled regions of the resin base and the modified portions of the glass fibers at least by immersing the resin base in a first solution having a different composition than a composition of the surface treatment gas after supplying the surface treatment gas so that an uneven surface is formed on the resin base and the glass fibers present near the surface of the resin base are at least partially exposed and projected in the uneven surface; and
  forming a film onto the uneven surface of the resin base, wherein a roughness of the uneven surface is in accordance with a difference between a state of the glass fibers after being modified by the fluorine gas and a state of the resin base after being embrittled by the fluorine gas.

2. The method of producing a film-attached resin base according to claim 1, wherein the removal of the embrittled regions form recesses, each of the recesses being recessed along a periphery of a partially exposed glass fiber in the uneven surface and being filled with the film.

3. The method of producing a film-attached resin base according to claim 1, wherein the glass fibers present near the surface of the resin base are at least partially porosified with the surface treatment gas.

4. The method of producing a film-attached resin base according to claim 1, wherein the first solution is an acidic solution.

5. The method of producing a film-attached resin base according to claim 4, wherein the acidic solution includes one or more acids selected from a group consisting of hydrochloric acid, sulfuric acid, and nitric acid.

6. The method of producing a film-attached resin base according to claim 1, wherein the resin base includes 10 to 60 mass percent of the glass fibers.

7. The method of producing a film-attached resin base according to claim 6, wherein the resin base includes the glass fibers having mass percent greater than 30.

8. The method of producing a film-attached resin base according to claim 1, wherein the film is a plating film, and said forming a film onto the uneven surface of the resin base comprises electroless plating.

9. The method of producing a film-attached resin base according to claim 1, wherein the film-attached resin base is a sliding part.

10. The method of producing a film-attached resin base according to claim 9, wherein the film-attached resin base is a slider for a slide fastener.

11. The method of producing a film-attached resin base according to claim 1, wherein the film is a coating film.

12. The method of producing a film-attached resin base according to claim 1, wherein the glass fibers present near the surface of the resin base have a diameter in a range of 5 µm to 20 µm and a length in a range of 100 µm to 250 µm.

13. The method of producing a film-attached resin base according to claim 1, wherein all of the glass fibers dispersed in the resin base are bare glass fibers.

14. The method of producing a film-attached resin base according to claim 1, wherein the glass fibers dispersed in the resin base are in direct contact with the resin base to ensure glass-resin contact.

15. The method of producing a film-attached resin base according to claim 1, wherein a peel strength of the film is equal to or greater than 0.4 kN/m.

16. The method of producing a film-attached resin base according to claim 1, further comprising washing the immersed resin base using a second solution, wherein said washing occurs after said removing the embrittled regions of the resin base and the modified portions of the glass fibers and before said forming a film onto the uneven surface of the resin base.

17. The method of producing a film-attached resin base according to claim 16, wherein said second solution is an alkaline solution.

18. The method of producing a film-attached resin base according to claim 16, wherein the film is a plating film, and said forming a film onto the uneven surface of the resin base comprises electroless plating that includes application of catalyst, acceleration by accelerator and deposition of the plating film.

19. The method of producing a film-attached resin base according to claim 18, wherein the film-attached resin base is a slider for a slide fastener, the slider having a top wing, a bottom wing and a coupling pillar that couples the top and the bottom wings, and wherein
  the film is formed at least on opposed inner surfaces of the top and bottom wings and a surface of the coupling pillar extending between the opposed inner surfaces.

* * * * *

UNITED STATES PATENT AND TRADEMARK OFFICE
CERTIFICATE OF CORRECTION

PATENT NO. : 11,174,362 B2
APPLICATION NO. : 16/098456
DATED : November 16, 2021
INVENTOR(S) : Abe Page 1 of 1

It is certified that error appears in the above-identified patent and that said Letters Patent is hereby corrected as shown below:

On the Title Page

Item (56), in Column 2, under "Other Publications", Line 1, delete "etal," and insert -- et al, --, therefor.

In the Specification

In Column 1, Line 22, delete "Mitsubishikasei" and insert -- Mitsubishi kasei --, therefor.

In Column 12, Line 39, delete "carrier" and insert -- carried --, therefor.

Signed and Sealed this
Eighteenth Day of January, 2022

Drew Hirshfeld
*Performing the Functions and Duties of the*
*Under Secretary of Commerce for Intellectual Property and*
*Director of the United States Patent and Trademark Office*